United States Patent
Masuda

(10) Patent No.: US 8,218,471 B2
(45) Date of Patent: Jul. 10, 2012

(54) APPARATUS, METHOD AND SYSTEM FOR RELAYING CALLS

(75) Inventor: Hiroyo Masuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 502 days.

(21) Appl. No.: 12/370,777

(22) Filed: Feb. 13, 2009

(65) Prior Publication Data

US 2009/0323581 A1 Dec. 31, 2009

(30) Foreign Application Priority Data

Jun. 25, 2008 (JP) ................................. 2008-165534

(51) Int. Cl.
*H04B 7/14* (2006.01)
(52) U.S. Cl. ........................................ 370/315; 370/400
(58) Field of Classification Search .................. 370/230, 370/230.1, 231, 325, 315, 328–329, 331–333, 370/400–401
See application file for complete search history.

(56) References Cited

U.S. PATENT DOCUMENTS

| | | | | |
|---|---|---|---|---|
| 5,425,019 A * | 6/1995 | Chugo et al. | ................. | 370/237 |
| 7,529,227 B2 * | 5/2009 | Seguin et al. | ................. | 370/352 |
| 7,577,427 B2 * | 8/2009 | Bicker et al. | ................. | 455/417 |
| 7,587,203 B2 * | 9/2009 | Shahidi et al. | ................. | 455/423 |
| 7,768,917 B2 * | 8/2010 | Nakayama et al. | ........ | 370/230.1 |
| 2003/0189926 A1 * | 10/2003 | Watanabe et al. | ................. | 370/389 |
| 2004/0109428 A1 * | 6/2004 | Krishnamurthy | ............. | 370/338 |
| 2006/0121900 A1 * | 6/2006 | Idnani et al. | ................. | 455/436 |
| 2008/0013531 A1 * | 1/2008 | Elliott et al. | ................. | 370/356 |
| 2009/0061881 A1 * | 3/2009 | Gonsa et al. | ................. | 455/442 |
| 2010/0142434 A1 * | 6/2010 | Rodmell et al. | ............. | 370/315 |

FOREIGN PATENT DOCUMENTS

| | | |
|---|---|---|
| CA | 2 609 246 | 12/2006 |
| JP | 2006-339969 | 12/2006 |

* cited by examiner

*Primary Examiner* — Chi H. Pham
*Assistant Examiner* — Kevin Mew
(74) *Attorney, Agent, or Firm* — Katten Muchin Rosenman LLP

(57) ABSTRACT

An apparatus connected to a communication terminal and for relaying a call between communication terminals. This apparatus includes a relay determiner, a priority determiner, and a relay controller. The relay determiner determines whether if a new call can be relayed based on the communication capacity, when there is a relaying request of a new call from a communication terminal or to a communication terminal. The priority determiner determines the priorities of a call that is being relayed and a new call based on the pre-configured policy. The relay controller may allow the relaying request of a new call by stopping the relaying of any existing call having a lower priority than the new call among the calls that are being relayed.

5 Claims, 15 Drawing Sheets

FIG.3

| Call ID | Phone number of transmitting terminal | Phone number of receiving terminal | Priority |
|---------|---------------------------------------|-----------------------------------|----------|
| **** | *-** | 03--** | High |
| **** | *-** | *-**** | Low |
| | | | |

Call management memory table 66

APPARATUS, METHOD AND SYSTEM FOR RELAYING CALLS

CROSS-REFERENCE TO RELATED APPLICATIONS

This application is based upon and claims the benefit of priority of the prior Japanese Patent Application No. 2008-165534, filed on Jun. 25, 2008, the entire content of which are incorporated herein by reference.

FIELD

The present invention relates to a technology for relaying calls, for calls that take place between communication terminals (called VoIP (Voice over Internet Protocol)), using wireless LAN (Local Area Network) system.

BACKGROUND

A call between communication terminals that occurs using wireless LAN system have a plurality of access points provided, and is realized by wirelessly transferring voice packets between communication terminals and access points that are connected to the LAN.

Normally, with this kind of access points, since the communication capacity that can be allocated for wireless communication is limited, sometimes it is not possible to satisfy the relaying requests of all of the calls. In such a case, it is necessary to limit the relaying requests of calls. For example, a control method of receiving calls is disclosed in Japanese Laid-open Patent Publication No. 2006-339969, in which, if calls through at least two or more telephone lines reach approximately at the same time, one of the telephone lines is selected on the side of the IP phone (communication terminal) based on a priority order that is set in advance.

With the control method that is disclosed in Japanese Laid-open Patent Publication No. 2006-339969, regardless of the state of the communication lines provided for a communication terminal, the priority of a new call for the communication terminal is determined by the communication terminal itself. However, under a state in which communication lines are congested, this new call does not reach the receiving terminal, and it is not possible for the receiving terminal to receive the call even if the priority of the new call is high. Also, under the state in which the communication lines are congested, it is not possible for the communication terminal to establish a call that is high in priority.

SUMMARY

The apparatus according to the present invention is connected to a communication terminal and is for relaying calls between communication terminals, and includes a relay determiner, a priority determiner, and a relay controller.

The relay determiner determines whether if a new call can be relayed based on the communication capacity, when there is a relaying request of a new call from a communication terminal or to a communication terminal. The priority determiner determines the priorities of a call that is being relayed and a new call using the pre-configured policy. The relay controller allows the relaying request of a new call by stopping the relaying of any existing call having a lower priority than this new call among the existing calls that are being relayed, if the relay determiner determines that this new call cannot be relayed, and the priority determiner determines that the priority of this new call is higher than that of a call being relayed. The method according to the present invention performs the same processes as the respective portions of this apparatus.

With this apparatus or method, the communication capacity for relaying a new call having a high priority is secured by stopping the relaying of the existing call having a low priority.

The system according to the present invention is for relaying calls between communication terminals, and includes a plurality of access points wirelessly connected to communication terminals, and a communication management device for managing the communication state of each of the plurality of access points.

Each of the plurality of access points give the communication management device a notice of whether if a new call can be relayed, based on the communication capacity of its own access point. The communication management device performs the following processes when there is a relaying request of a new call from a communication terminal or to a communication terminal, and in the case that the priority of the new call is high compared to a call that is being relayed and that a first access point to which the communication terminal is connected is not able to relay the new call. In other words, based on the notice from each access point, another second access point that is able to relay the new call is selected, and the information used for connecting to the second access point is sent to the communication terminal via the first access point. Another method according to the present invention performs the same processes as the respective configuration elements of this system.

With this system or method, even if the first access point to which the communication terminal is connected is not able to relay the new call, through the communication management device, information used for connecting to the second access point that is able to relay the new call having a high priority is provided to the communication terminal. Therefore, the new call can be relayed through the second access point.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

Referring now to the attached drawings which form a part of this original disclosure:

FIG. 3 is a diagram illustrating the configuration of a call management memory table;

DESCRIPTION OF EMBODIMENT(S)

First Embodiment

An embodiment of the apparatus of the present invention will be described below with reference to the drawings.

Figure 1:
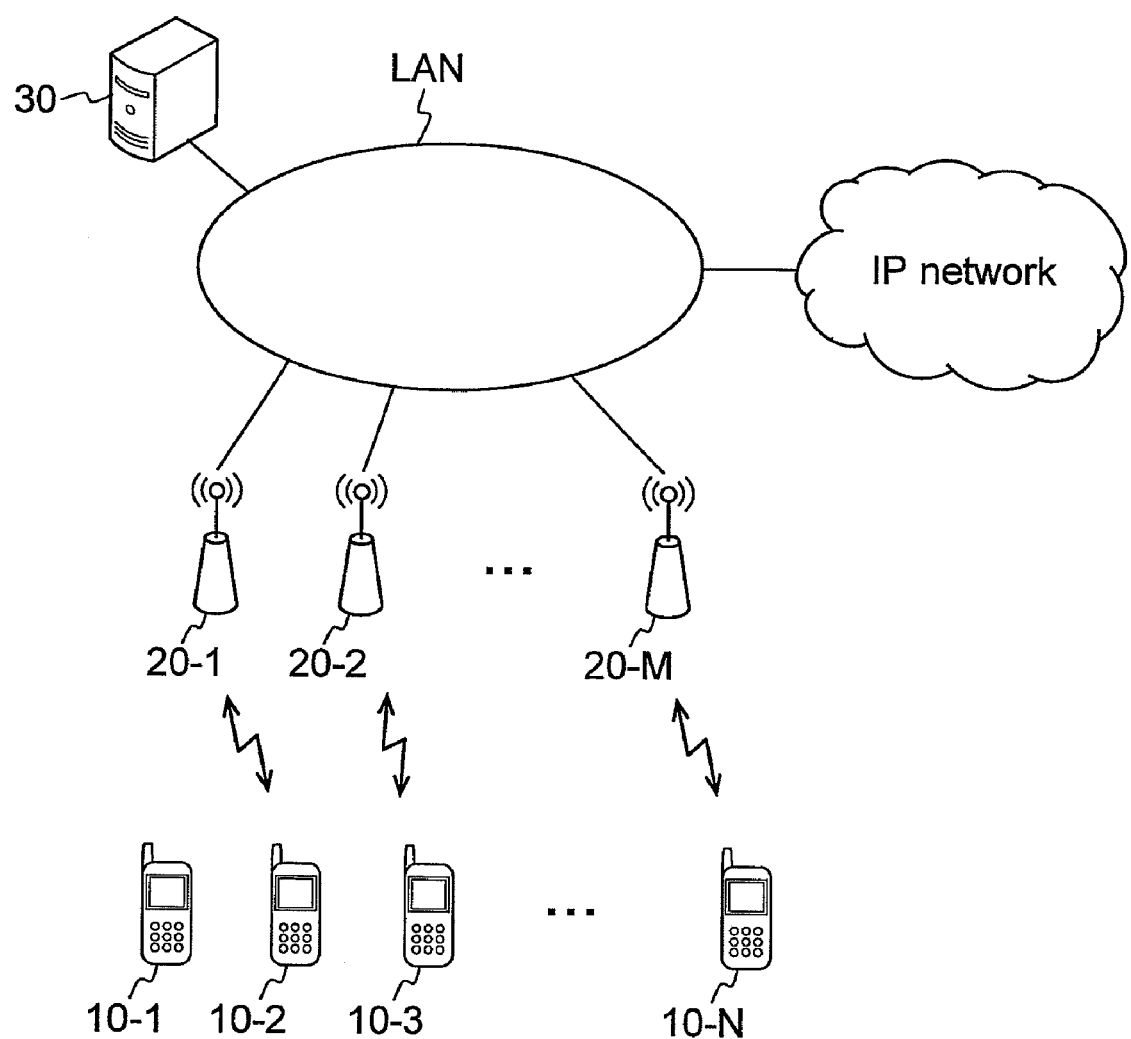
FIG. 1 is a diagram illustrating the configuration of a wireless LAN system of a first embodiment.

FIG. 1 depicts a configuration of a wireless LAN system including access points, as the apparatus according to this embodiment. With the wireless LAN system depicted in FIG. 1, a plurality of communication terminals (or User Equipment (UE)) 10-1, 10-2, 10-3, ..., 10-N is configured to be able to wirelessly communicate with access points 20-1, 20-2, ..., 20-M, and the access points are each connected to a wired LAN (hereinafter, briefly indicated simply as "LAN"). This LAN is further connected to an external IP (Internet Protocol) network.

With this wireless LAN system, in order to establish calls (media streaming by compressed voice data in packets) between the communication terminals, the establishment and the disconnection (the start and end of a session) of calls according to SIP (Session Initiation Protocol) are performed. Once a call is established, the transferring of voice packets is performed according to RTP/RTCP (Real-time Transport Protocol/Real-time Transport Control Protocol) directly between the communication terminals without going through the SIP server, which will be described later. In FIG. 1, the SIP server 30 that is connected to the LAN is provided for performing call control according to SIP.

[Configuration of the Wireless LAN System]

Figure 2:
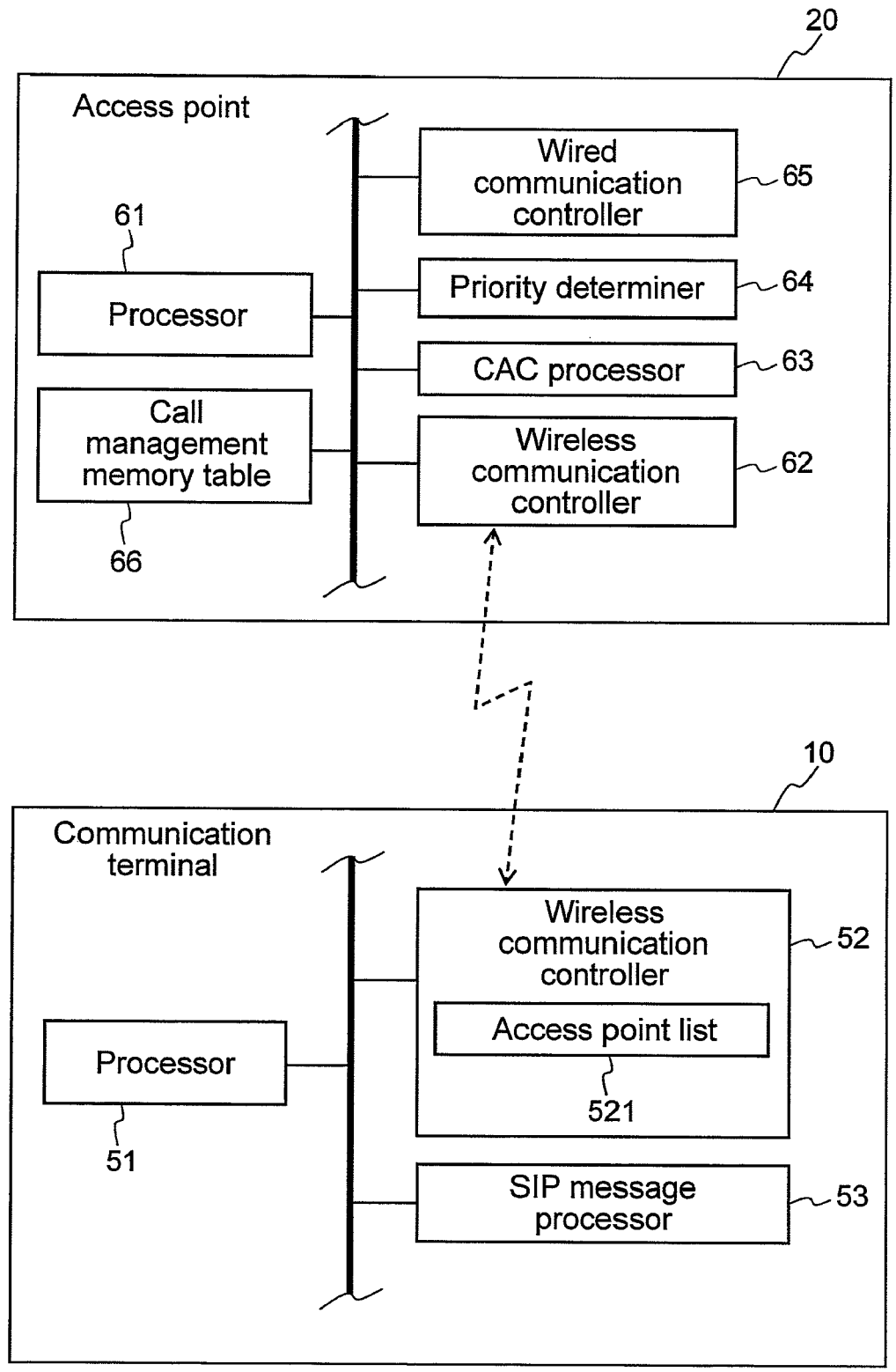
FIG. 2 is a block diagram illustrating the configuration of a communication terminal and an access point.

Next, each element that forms the wireless LAN system depicted in FIG. 1 will be described with reference to FIG. 2. FIG. 2 is a block diagram for describing the configuration of each of the plurality of communication terminals and the plurality of access points. In addition, in the following description, each of the communication terminals is simply referred to as communication terminal 10 for the descriptions common to each of the plurality of communication terminals, and each of the access points is simply referred to as access point 20 for the descriptions common to each of the plurality of access points.

[Communication Terminal 10]

As depicted in FIG. 2, the communication terminal 10 includes a processor 51, a wireless communication controller 52, and a SIP message processor 53. The processor 51 compresses and decompresses voice data, and also executes calculation processing, timing processing, and data processing within the communication terminal 10. The wireless communication controller 52 has a wireless communication function that is standardized by IEEE 802.11, for instance, and generates packets and performs the receiving and transmitting of packets with the access point 20.

The wireless communication controller 52 transmits a probe request packet for demanding the usage permission from all channels set in the plurality of access points 20 when the power turns on, and registers the access point name and channel in the access point list 521 when a probe response packet indicating communication permission from an access point 20 is received.

The wireless communication controller 52 decides on a specific access point from the plurality of access points from which probe response packets are received, in other words, from the access points registered in the access point list 521, and transmits an association request packet for demanding connection permission. For example, the wireless communication controller 52 transmits an association request packet to the access point with the greatest receiving strength, from the plurality of access points from which the probe response packets are received.

In addition, the wireless communication controller 52 starts a communication connection operation if an association response packet indicating connection permission is received from the access point to which the association request packet is sent.

The communication terminal 10 of this embodiment can be instructed to switch the connection from the access point in connection to another access point (switching of access points). This switching of access points is performed for the purpose of roaming processing with the movement of the communication terminal 10 itself, and also, in this embodiment, for the purpose of switching the relaying of a call that is low in priority to another access point.

More specifically, the switching of the access points is performed as follows. That is, when the wireless communication controller 52 received a de-association notice packet, which is a notice of switching from the access point to which connection is permitted to the access point to be connected next, the wireless communication controller 52 transmits a re-association request packet for demanding communication connection to the next access point, and furthermore, receives a re-association response packet indicating connection permission. The access point name and channel from which the re-association response packet is sent are registered in the access point list 521.

The SIP message processor 53 generates SIP messages for transmitting to the SIP server 30 and analyzes SIP messages received from the outside, in order to perform communication according to SIP via the wireless communication controller 52. SIP messages include REGISTER request for requesting the registration of communication terminal 10 in the SIP server 30 prior to a call, INVITE request for requesting the establishment of a call with the other communication terminal for which the call is intended, BYE request for requesting the disconnection of a call, OK response (code 200) as a response for indicating that the INVITE request was successful, ERROR response (code 406) as a response for indicating that the INVITE request was unable to be accepted, and the like.

The SIP message includes information that shows the contents of a request or a response (SIP method such as REGISTER and the like, or response codes such as 200 and the like), and also includes, in the header portion thereof, a unique call ID for specifying a call, and SIP URI (Uniform Resource Identifier; hereinafter, briefly indicated as "URI") as the information for specifying one's self and the destination. This URI is referred to at the SIP server 30. In addition, the phone numbers of the transmitting terminal and the receiving terminal are described in the INVITE request for establishing a call with the other communication terminal.

[Access Point 20]

The access point 20 performs wireless communication with the communication terminal 10 that is positioned within the range that can be reached by the electrical wave of the access point itself, and performs the relaying of the SIP messages between the communication terminal 10 and the SIP server 30 and the relaying of voice packets between communication terminals. As it will be described later, this access point 20 includes a Call Admission Control (hereinafter, briefly indicated as CAC), which is a known function for ensuring a certain communication quality for a plurality of calls that are being relayed at the same time. Through this CAC, the number of simultaneous calls, which is controlled by the access point in response to the communication capacity of the access point, is limited, and the communication line becoming in a congested state is avoided.

As depicted in FIG. 2, the access point 20 includes a processor 61 (relay controller), a wireless communication controller 62, a CAC processor 63 (relay determiner), a priority determiner 64, a wired communication controller 65, and a call management memory table 66.

The wireless communication controller 62 has a wireless communication function standardized by IEEE 802.11, for instance, and performs the receiving and transmitting of packets with the communication terminal 10. The wired communication controller 65 is connected to the wired LAN.

The wireless communication controller 62 transmits a probe response packet to the communication terminal 10, if the wireless communication controller 62 receives a probe request packet from the communication terminal 10 and permits the communication between its own access point 20 and the communication terminal 10. Furthermore, if the wireless communication controller 62 receives an association request packet for demanding connection permission from the communication terminal 10 and permits the connection, the wireless communication controller 62 transmits an association response packet indicating connection permission to the communication terminal 10. As a result, wireless communication between the communication terminal 10 and the access point 20 is established.

The access point 20 in this embodiment can instruct to switch the connection with respect to the communication terminal that is being connected to another access point (switching of access points). This switching of access points is performed for the purpose of roaming processing with the movement of the communication terminal 10 itself, and also, in this embodiment, for the purpose of switching the relaying of a call that is low in priority to another access point. More specifically, the instruction of the switching of access points is performed by the wireless communication controller 62 transmitting a de-association notice packet to the communication terminal 10 that is in connection.

When an INVITE request for establishing a new call with respect to the communication terminal 10 in connection or from the communication terminal 10 in connection is received, the CAC processor 63 as the relay determiner determines whether to relay the new call or not based on the communication capacity. A maximum number of calls that can be simultaneously relayed is set in advance as the standard value in the CAC processor 63, for instance, and it is determined whether or not the number of calls being relayed at the same time will exceed the standard value, suppose if the new call is accepted. This determination may be performed based on the maximum bandwidth (summation of the rate of data transfer) that simultaneous relaying is possible. In this case, it is determined whether or not the summation of the bandwidth of relaying simultaneously exceeds the predetermined standard value, suppose if the new call is accepted.

When a new call (transmit or receive signal) occurs from the communication terminal 10 or to the communication terminal 10, the priority determiner 64 determines the priority of that call. More specifically, the priority determiner 64 determines the priority based on the phone number of the transmitting terminal or the receiving terminal included in the INVITE request for establishing the call.

The determination of priority based on the phone number of the transmitting terminal or the receiving terminal is performed based on a predetermined standard value. For instance, when the wireless LAN system of this embodiment is implemented inside a company, the priority determiner 64 makes the index value based on the phone number of the transmitting terminal or the receiving terminal be "1" if it is a specific number, such as the number of the president of the company and the like, or if it is an external number, and makes the index value be "0" if it is a number other than these numbers. Then, in the priority determiner 64, the predetermined standard value is set to "0" in advance, for instance, and if the above index value is greater than the standard value, it is determined that "the priority of the call is high".

The determination standard of the priority is not limited to the above described example, and it is possible to set from various aspects. For instance, a plurality of communication terminals that can be connected to the LAN may be grouped in advance, and it may be determined that "the priority of the call is high" in the case of transmitting a signal to a communication terminal in another group, and determined that "the priority of the call is low" in the case of transmitting a signal to a communication terminal inside the same group.

The call management memory table 66 is provided for managing calls that are being relayed. The configuration of the call management memory table 66 is depicted in FIG. 3. As illustrated in FIG. 3, the IDs of calls being relayed, the phone numbers of the transmitting terminals, the phone numbers of the receiving terminals, and the priorities are recorded in the call management memory table 66.

The processor 61 records the call ID, the phone number of the transmitting terminal, and the phone number of the receiving terminal in the call management memory table 66 based on the INVITE request from the communication terminal 10 when the relaying of a call starts, and records the priority of the call based on the determination result of the priority determiner 64. When the relaying of the call ends, the processor 61 deletes the call being the object of the request from the call management memory table 66, based on the BYE request from the communication terminal 10. In addition, the processor 61 refers to the call management memory table 66 in order to search for a call with a low priority.

[Access Point Determines Whether to Permit Relaying]

Figure 4:
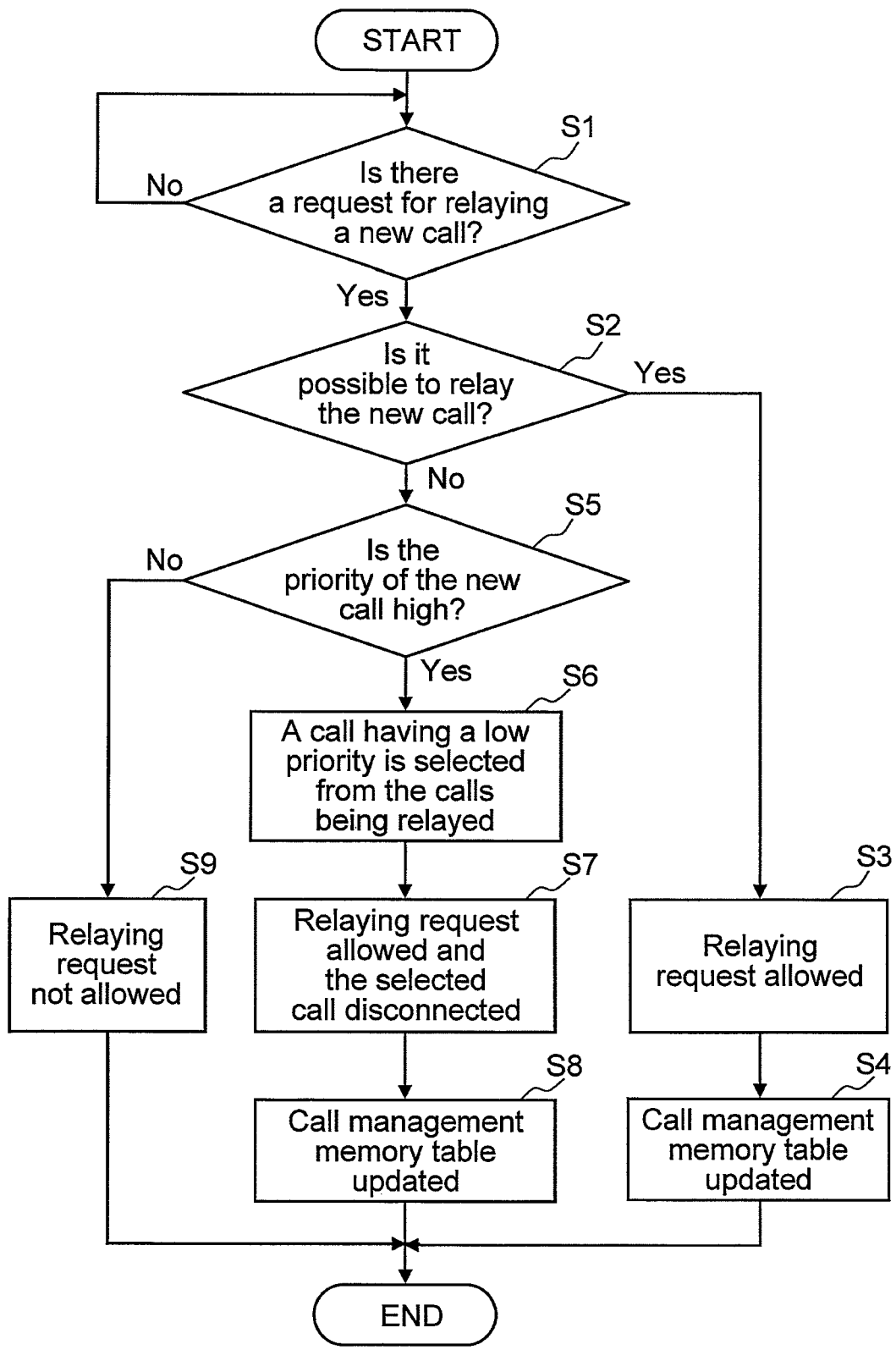
FIG. 4 is a flow chart illustrating the determination method of an access point with respect to a relaying request of a new call.

Next, if there is a relaying request (transmitting signal request or receiving signal request) of a new call from the communication terminal 10 within the communication area of the access point 20 or to that communication terminal 10, the determination method on whether to permit or not permit the relaying request will be described with reference to FIG. 4. FIG. 4 is a flow chart illustrating the determination method of the access point 20 with respect to a relaying request of a new call. This flow chart is executed by the processor 61 of the access point 20.

In Step S1 in FIG. 4, the processor 61 determines whether if there is a relaying request of a new call, depending on whether or not an INVITE request is received. When there is a relaying request of a new call (YES in Step S1), the determination result of the CAC processor 63 is being referred. That is, if the CAC processor 63 determined that it is possible to relay a new call (YES in Step S2), the processor 61 permits the relaying request of that new call (Step S3). Furthermore, the processor 61 records the call ID and the phone numbers (transmitting terminal and receiving terminal) included in the INVITE request, and the priority of the new call determined by the priority determiner 64 in the call management memory table 66 (Step S4).

If the CAC processor 63 determined that the new call cannot be relayed (NO in Step S2), the processor 61 refers to the determination result of the priority determiner 64 for that new call. Then, if the priority of the new call is determined to be high (YES in Step S5), the following process is performed in order to be able to relay the new call, which the priority is high. That is, the processor 61 refers to the call management memory table 66, and selects a call from any of the calls that are being relayed and are low in priority (Step S6).

In addition, in Step S6, as a result of referring to the call management memory table 66, if there is a plurality of calls being relayed and are low in priority, the call with the lowest priority may be selected, according to the priorities in detail set in advance based on the phone numbers of the transmitting terminals or the receiving terminals. For instance, the priority of a call may be set to be the highest if the phone number of the receiving terminal indicates an external number, the priority may be set to be around the middle if the number indicates a number in another group that is different from the receiving terminal, and the priority may be set to be the lowest if the number indicates a number within the same group as the receiving terminal.

Furthermore, in Step S6, the call with the longest calling time period may be selected from the calls being relayed and are low in priority. In this case, the processor 61 calculates the calling time periods based on the times that the INVITE requests are received and the present time.

After referring to the call management memory table 66 and after a call with a low priority and being relayed is selected, the processor 61 permits the relaying request of the new call, and disconnects the relaying of the selected call having a low priority (Step S7). More specifically, the processor 61 transfers the INVITE request with respect to the new call having a high priority, and transmits a de-association notice packet to the communication terminal 10 to which the call with a low priority is being relayed.

In addition, the processor 61 deletes the selected call with a low priority from the call management memory table 66, and records the call ID and phone numbers (transmitting terminal and receiving terminal) included in the INVITE request for the new call, and the priority of the new call determined by the priority determiner 64 in the call management memory table 66 (Step S8).

On the other hand, if the CAC processor 63 determined that the new call cannot be relayed (NO in Step S2) and determined that the priority of the new call is low (NO in Step S5), since it is not necessary to relay the new call, the processor 61 does not permit the relaying request of the new call (Step S9).

[SIP Server 30]

Next, the SIP server 30 will be described with reference to FIG. 5.

The SIP server 30 is connected to the LAN, and when calling is performed according to SIP between communication terminals 10, the SIP server 30 plays the role of assisting the establishment and disconnection of calls between terminals by relaying SIP messages (requests and responses).

Figure 5:
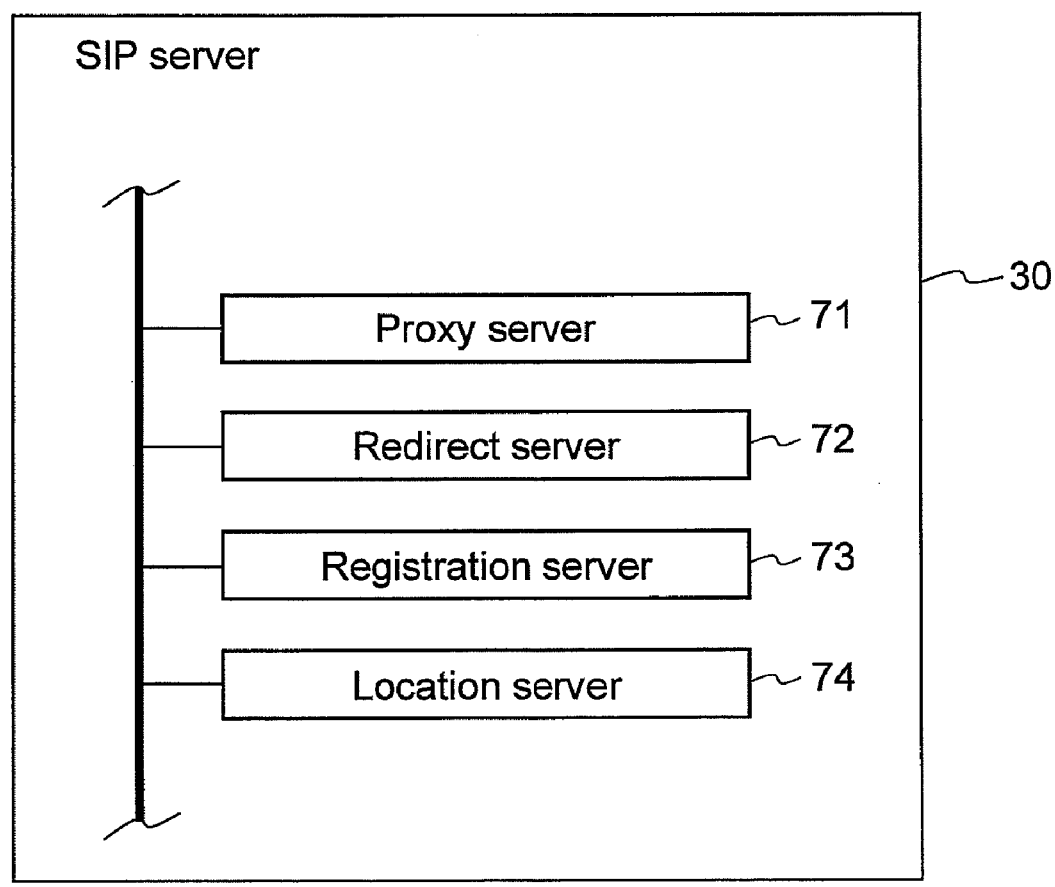
FIG. 5 is a block diagram illustrating the configuration of a SIP server.

FIG. 5 is a block diagram for illustrating the configuration of the SIP server 30. As depicted in FIG. 5, the SIP server 30 includes a proxy server 71, a redirect server 72, a registration server (registrar server) 73, and a location server 74. These servers 71 to 74 may each physically exist separately.

In FIG. 5, the registration server 73 registers the URI and the IP address of the communication terminal 10 in the location server 74 based on a REGISTER request from the communication terminal 10. The proxy server 71 obtains the IP address of the transferring destination from the location server 74 based on the URI included in the header of the SIP message, and transfers (routing) the SIP message. The redirect server 72 is a server for notifying the IP address of the receiving terminal to the transmitting terminal.

Through call control performed by this SIP server 30, once a call is established, the communication terminal 10 is able to perform data transfer according to RTP/RTCP directly without considering changes in the IP address with the movement of the terminal.

[Operation of the Wireless LAN System]

Figure 6:
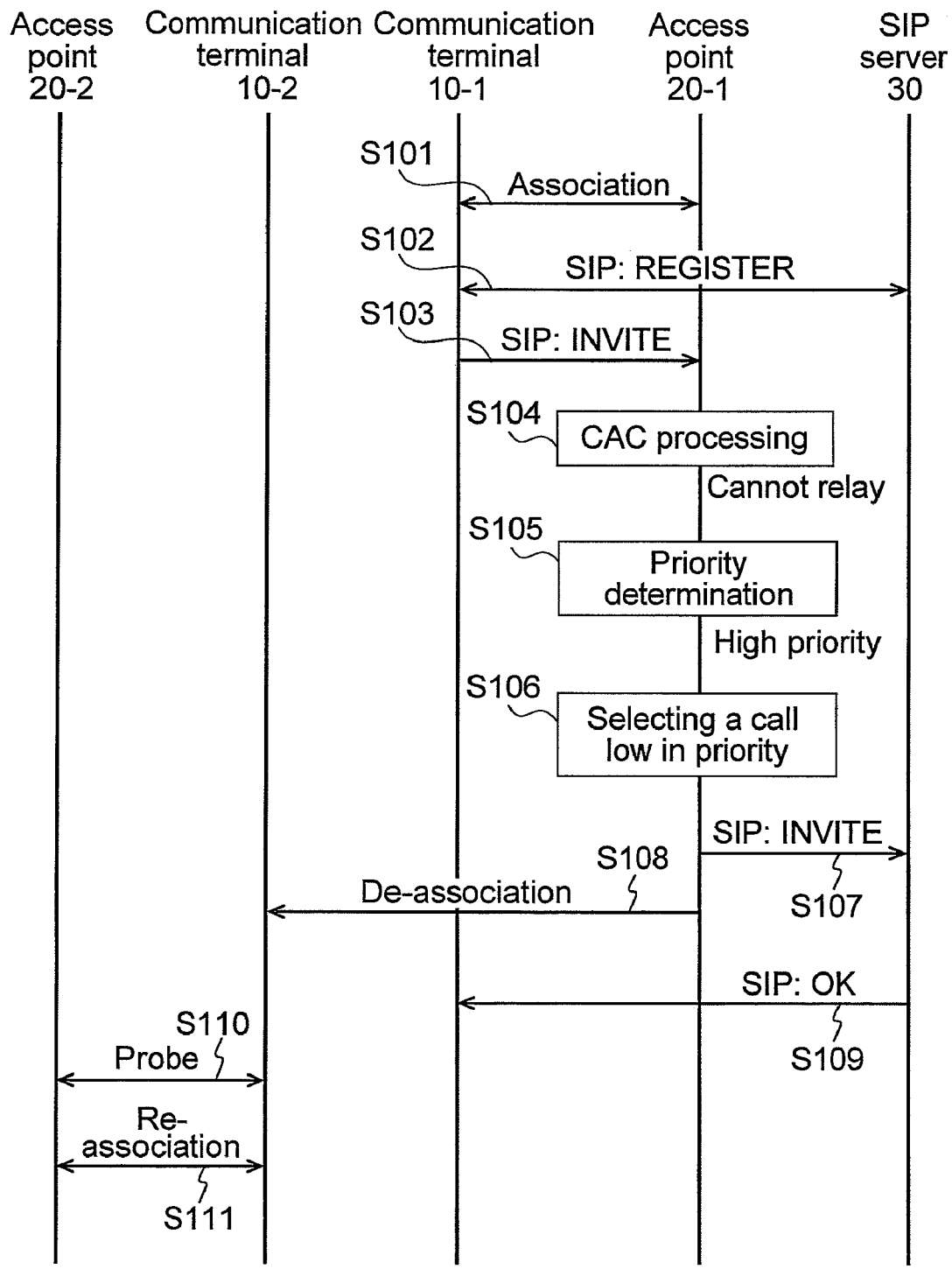
FIG. 6 is a flow diagram illustrating the overall operation in the case that the establishment of a call high in priority is requested from a communication terminal (in the case of transmitting a signal), in the first embodiment.
Figure 7:
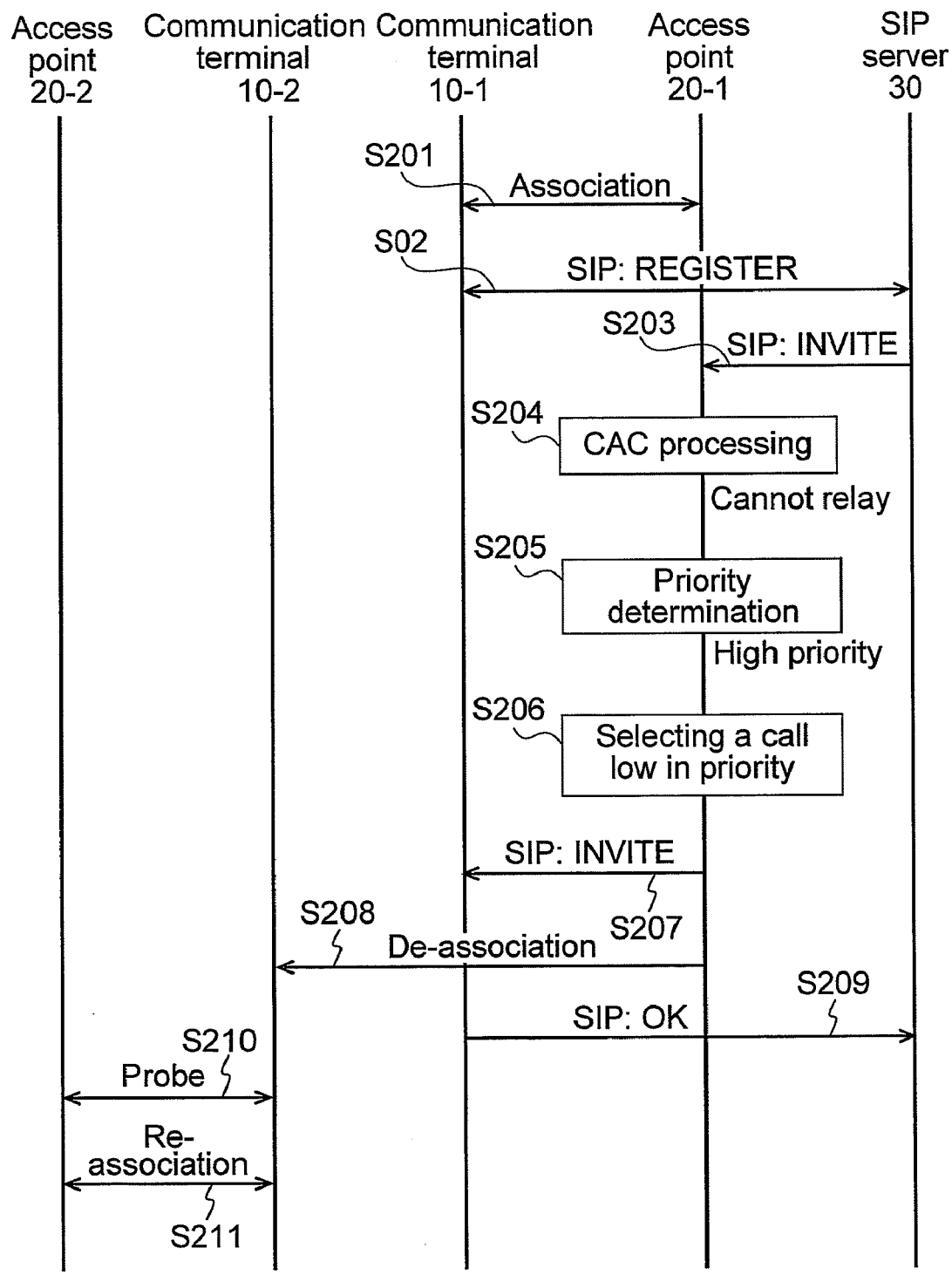
FIG. 7 is a flow diagram illustrating the overall operation in the case that the establishment of a call high in priority is requested with respect to a communication terminal (in the case of receiving a signal), in the first embodiment.

The overall operation of the wireless LAN system of this embodiment will be described below with reference to FIGS. 6 and 7. FIG. 6 is a flow diagram illustrating the overall operation in the case that the establishment of a call of high priority is requested from a communication terminal (in the case of transmitting a signal). FIG. 7 is a flow diagram illustrating the overall operation in the case that the establishment of a call of high priority is requested with respect to a communication terminal (in the case of receiving a signal).

(1) In the Case of Transmitting a Signal

In FIG. 6, as an example, the overall operation of the wireless LAN system is represented, in the case that the communication terminal 10-1 within the communication area of the access point 20-1 transmits a signal specifying, for instance, an external number, as a call high in priority.

First, in FIG. 6, the communication terminal 10-1 transmits an association request packet (Association) to the access point 20-1, and when an association response packet is received from the access point 20-1, wireless communication between the communication terminal 10-1 and the access point 20-1 is started (Step S101).

Prior to calling, the communication terminal 10-1 transmits a REGISTER request (SIP: REGISTER) including the phone number of its own terminal to the SIP server 30 via the access point 20-1 (Step S102). Based on this REGISTER request, the URI of the communication terminal 10-1 and the corresponding IP address are registered in the SIP server 30.

Here, if a calling operation is performed with the external number specified for the communication terminal 10-1, the communication terminal 10-1 transmits an INVITE request (SIP: INVITE) to the access point 20-1 (Step S103). The access point 20-1 does not immediately transfer this INVITE request (SIP: INVITE) to the SIP server 30, and performs the processes of Steps S104, S105, and S106. In addition, the processes of Steps S104, S105, and S106 correspond to the processes of Steps S2, S5, and S6 in FIG. 4, respectively.

First, the access point 20-1 determines whether if it is possible to relay the new call arose in Step S103 by performing CAC processing (Step S104). As a result, if it is determined that the new call cannot be relayed, the access point 20-1 determines the priority of the new call that arose in Step S103 (Step S105). This priority determination is performed based on the phone number described in the header of the INVITE request received in Step S103. In this example of the overall operation, since the phone number of the receiving terminal is an external number, in Step S105, the priority of the new call is determined to be high.

If it is determined that the call cannot be relayed by the CAC processing, and determined that the priority of the new call is high, the access point 20-1 secures a bandwidth for relaying the new call having a high priority by stopping the relaying of a call that is already being relayed and having a low priority. In order to do so, first, the access point 20-1 refers to the call management memory table 66 inside its own access point, and selects a call from any of the calls that are being relayed and are low in priority (Step S106).

Then, the access point 20-1 permits the relaying request of the new call having a high priority, and disconnects the relaying of the selected call with a low priority. More specifically, the access point 20-1 transfers the INVITE request for the new call having a high priority to the SIP server 30 (Step S107), and transmits a de-association notice packet (De-association) to the communication terminal 10-2 to which the call with a low priority is being relayed (Step S108). By doing so, the connection of the communication terminal 10-2 with the access point 20-1 is stopped.

Even though it is not illustrated in FIG. 6, based on the INVITE request (SIP: INVITE) received in Step S107, the SIP server 30 specifies the IP address of the receiving terminal and transfers the request. Then, an OK response (SIP: OK) from the receiving terminal is transferred to the communication terminal 10-1 via the SIP server 30 and the access point 20-1 (Step S109). After that, calling through the transferring (transmission/reception) of voice packets according to RTP/RTCP is started between the terminals.

When the connection of the communication terminal 10-2 with the access point 20-2 is stopped in Step S108, the communication terminal 10-2 is able to perform the transmitting and receiving of packets in order to start communication with an access point other than the access point 20-1 (in the example in FIG. 6, access point 20-2), in response to the calling operation for its own terminal (Steps S110, S111).

In addition, in Step S108, the access point 20-1 may transmit a message indicating that communication is to be disconnected, prior to transmitting the de-association notice packet (De-association) to the communication terminal 10-2. By doing so, the communication terminal 10-2 is able to inform the user by displaying a message or outputting an audio for announcing in advance that communication is to be disconnected.

(2) In the Case of Receiving a Signal

In FIG. 7, as an example, the overall operation of the wireless LAN system is represented, in the case that the communication terminal 10-1 within the communication area of the access point 20-1 receives a signal that indicates, for instance, an external number, as a call high in priority.

First, in FIG. 7, the communication terminal 10-1 transmits an association request packet to the access point 20-1, and when an association response packet is received from the access point 20-1, wireless communication between the communication terminal 10-1 and the access point 20-1 is started (Step S201).

Prior to calling, the communication terminal 10-1 transmits a REGISTER request (SIP: REGISTER) including the phone number of its own terminal to the SIP server 30 via the access point 20-1 (Step S202). Based on this REGISTER request, the URI of the communication terminal 10-1 and the corresponding IP address are registered in the SIP server 30.

Here, when there is a receipt of a signal (new call) with communication terminal 10-1 as the destination, the SIP server 30 transfers the INVITE request (SIP: INVITE) from the transmitting terminal to the access point 20-1 (Step S203). The access point 20-1 does not immediately transfer this INVITE request (SIP: INVITE) to the communication terminal 10-1, and performs the processes of Steps S204 to S206. The processes of the Steps S204 through 206 are the same as the processes of Steps S104 through 106 in FIG. 6. In other words, if it is determined that the call cannot be relayed by the CAC processing and determined that the new call has a high priority, the access point 20-1 selects a call that is low in priority from the calls that are already being relayed.

Then, the access point 20-1 permits the relaying request of the new call, and disconnects the relaying of the selected call with a low priority. More specifically, the access point 20-1 transfers the INVITE request for the new call with a high priority to the communication terminal 10-1 (Step S207), and transmits a de-association notice packet (De-association) to the communication terminal 10-2 that is within the communication area of its own access point to which the call with a low priority is being relayed (Step S208). By doing so, the connection of the communication terminal 10-2 with the access point 20-1 is stopped.

When a signal receipt response operation is performed for the communication terminal 10-1, an OK response (SIP: OK) in response to the INVITE request is transferred to the transmitting terminal via the access point 20-1 and the SIP server 30 (Step S209). After that, calling is started between the terminals by the transferring of voice packets according to RTP/RTCP. The communication terminal 10-2, which the connection thereof is stopped in Step S208, able to start communication with an access point (in the example in FIG. 7, access point 20-2) other than the access point 20-1 (Steps S210 and S211) is the same as the case in FIG. 6.

As described above, if it is determined that a new call cannot be relayed based on the communication capacity and determined that the priority of the new call is high, the access point in this embodiment selects a call with a low priority from the calls that are being relayed, and stops the relaying of the call that is low in priority. As a result, in this access point, a bandwidth for relaying a new call having a high priority is secured.

Furthermore, in this embodiment, even though the access points as an example of the apparatus of the present invention were described, the apparatus of the present invention is not limited to the access points. Other examples of the apparatus of the present invention may be any device that is able to control the relaying of calls between communication terminals via a network, for instance, a wireless LAN switch or a wireless LAN controller, and the like, that manages in an integrated fashion the communication state of a plurality of access points.

For instance, with a wireless LAN system including a wireless LAN switch, when relaying calls between terminals, SIP messages and voice packets are transferred via the access points and the wireless LAN switch. Then, based on the information on the communication state from each access point, in order to distribute communication burden in the plurality of access points, the wireless LAN switch has a configuration of able to always recognize whether if a new call can be relayed in each of the access points. Therefore, by having the functions corresponding to the priority determiner 64 and the call management memory table 66 (refer to FIG. 2) of the above described access point 20 on the side of the wireless LAN switch, the wireless LAN switch will be able to realize the same effects as the access point 20 of the above described embodiment.

Second Embodiment

Next, as an embodiment of the system of the present invention, a wireless LAN system in which the relaying of a new call high in priority is also possible without stopping the relaying of a call that is low in priority will be described. In this wireless LAN system, different from that of the first embodiment, not only whether if the relaying of a new call of the access point connected to the communication terminal to which the new call is intended, but whether if relaying is possible for a plurality of access points is being referred. Therefore, with the wireless LAN system of this embodiment, the wireless LAN switch (communication management device) for managing in an integrated fashion the communication state of the plurality of access points is connected to the LAN.

[Configuration of the Wireless LAN System]

Figure 8:
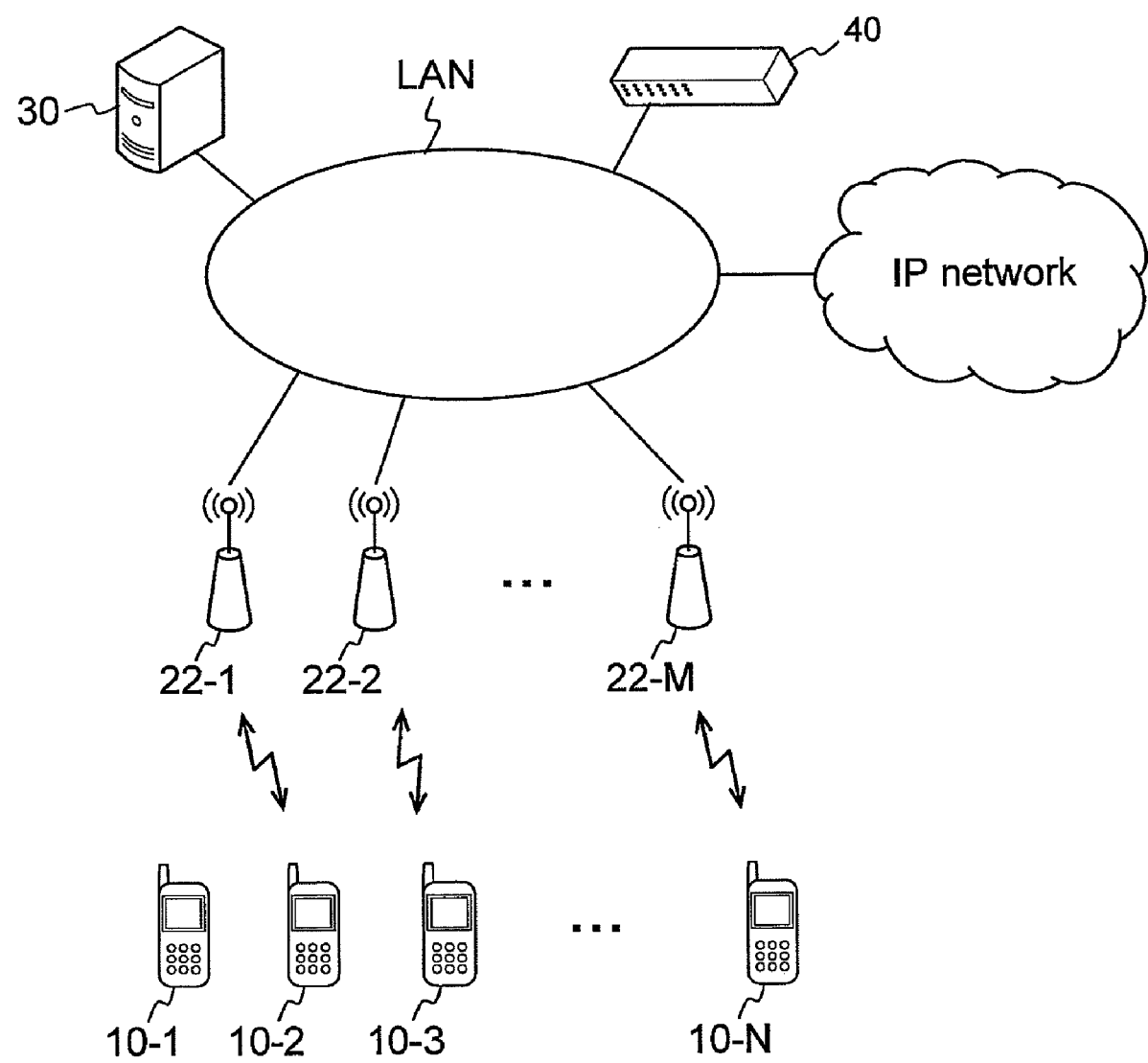
FIG. 8 is a diagram illustrating the configuration of a wireless LAN system of a second embodiment.

FIG. 8 depicts the configuration of the wireless LAN system of this embodiment. As illustrated in FIG. 8, in this wireless LAN system, a plurality of communication terminals 10-1, 10-2, 10-3, . . . , 10-N are configured to be able to wirelessly communicate with access points 22-1, 22-2, . . . , 22-M, and each access point is connected to the LAN. In this wireless LAN system, different from that (refer to FIG. 1) of the first embodiment, a wireless LAN switch 40 as the communication management device is connected to the LAN. The LAN is further connected to an external IP network.

In addition, in the following description, same as the description in the first embodiment, each of the communication terminals is simply referred to as communication terminal 10 for the descriptions common to each of the plurality of communication terminals, and each of the access points is simply referred to as access point 22 for the descriptions common to each of the plurality of access points.

Figure 9:
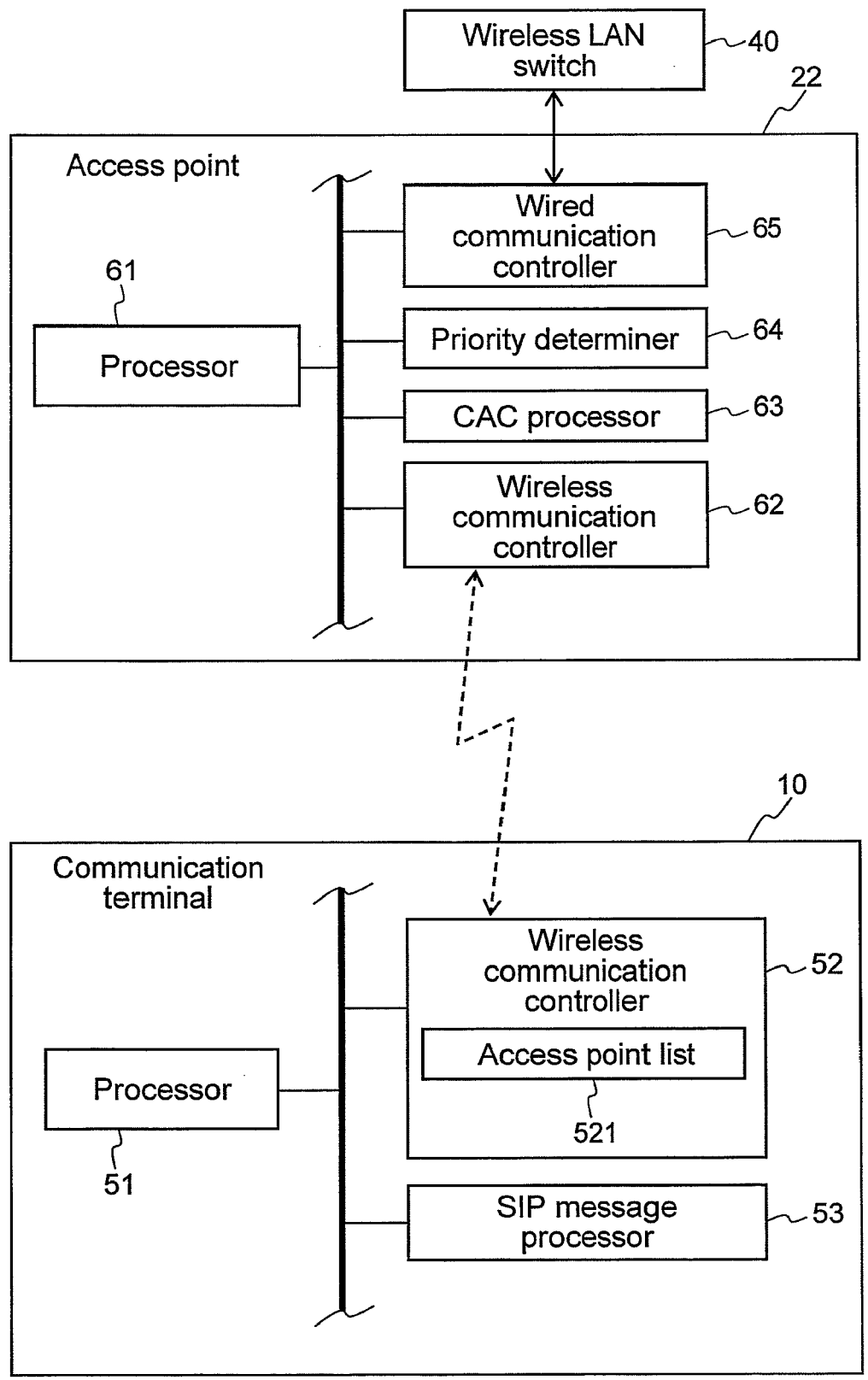
FIG. 9 is a block diagram illustrating the configuration of a communication terminal and an access point in the wireless LAN system in the second embodiment.

FIG. 9 is a block diagram illustrating the configuration of the communication terminal 10 and the access point 22 in the wireless LAN system of this embodiment. A wired communication controller 65 of the access point 22 is connected to the wireless LAN switch 40 via the LAN.

Furthermore, in FIG. 9, the portions that are same as the communication terminal 10 and access point 20 depicted in FIG. 2 are given the same numerals.

[Access Point 22]

Below, where the access point 22 in this embodiment is different from that of the access point 20 in the first embodiment will be described.

The access point 22, different from the access point 20, does not need a call management memory table for managing calls that are being relayed, since it is not necessary to select a call that is being relayed and low in priority.

In addition, the access point 22 performs the transmitting and receiving of control information with the wireless LAN switch 40 according to a predetermined protocol via the wired communication controller 65. The access point 22 transmits the processing result of the CAC processor 63, in other words, a notice on whether if it is possible to relay a new call (hereinafter, indicated as "RELAY DECISION NOTICE") to the wireless LAN switch 40, as such control information. The transmission of this RELAY DECISION NOTICE is performed at a predetermined timing. The transmission of the RELAY DECISION NOTICE may be, for instance, performed regularly, or may be performed when the access point 22 received an INVITE request, or performed when the processing result on whether if it is possible to relay a new call changed.

The processor 61 of the access point 22 transmits an access point request signal (AP_REQ) to the wireless LAN switch 40 for inquiring about another access point that is able to relay a call, if the CAC processor 63 determined that a new call (signal transmitted) from the communication terminal 10 connected to its own access point cannot be relayed, and determined that the priority of that new call is low.

The processor 61 receives access point information (AP information) sent from the wireless LAN switch 40 in response to the access point request signal (AP_REQ), and transfers that access point information to the transmitting terminal. Here, access point information is information used for connecting to another access point that is able to relay. The access point information includes MAC (Media Access Control) address of an access point that is able to relay in the case that Ethernet (registered trademark) is used, for instance, and information related to the place that an access point that is able to relay is disposed (in the case of a LAN inside a company, information such as specific floor, column number, and the like inside the company).

When there is a new call (signal received) to the communication terminal 10 that is connected to its own access point, and if an access point switching request signal (AS_REQ) is received from the wireless LAN switch 40 for requesting the switching of access point to another access point, the processor 61 transmits a de-association notice packet to that communication terminal 10. In the access point switching request signal (AS_REQ), access point information (AP information) of the access point of the switching destination is included.

[Wireless LAN Switch 40]

Figure 10:
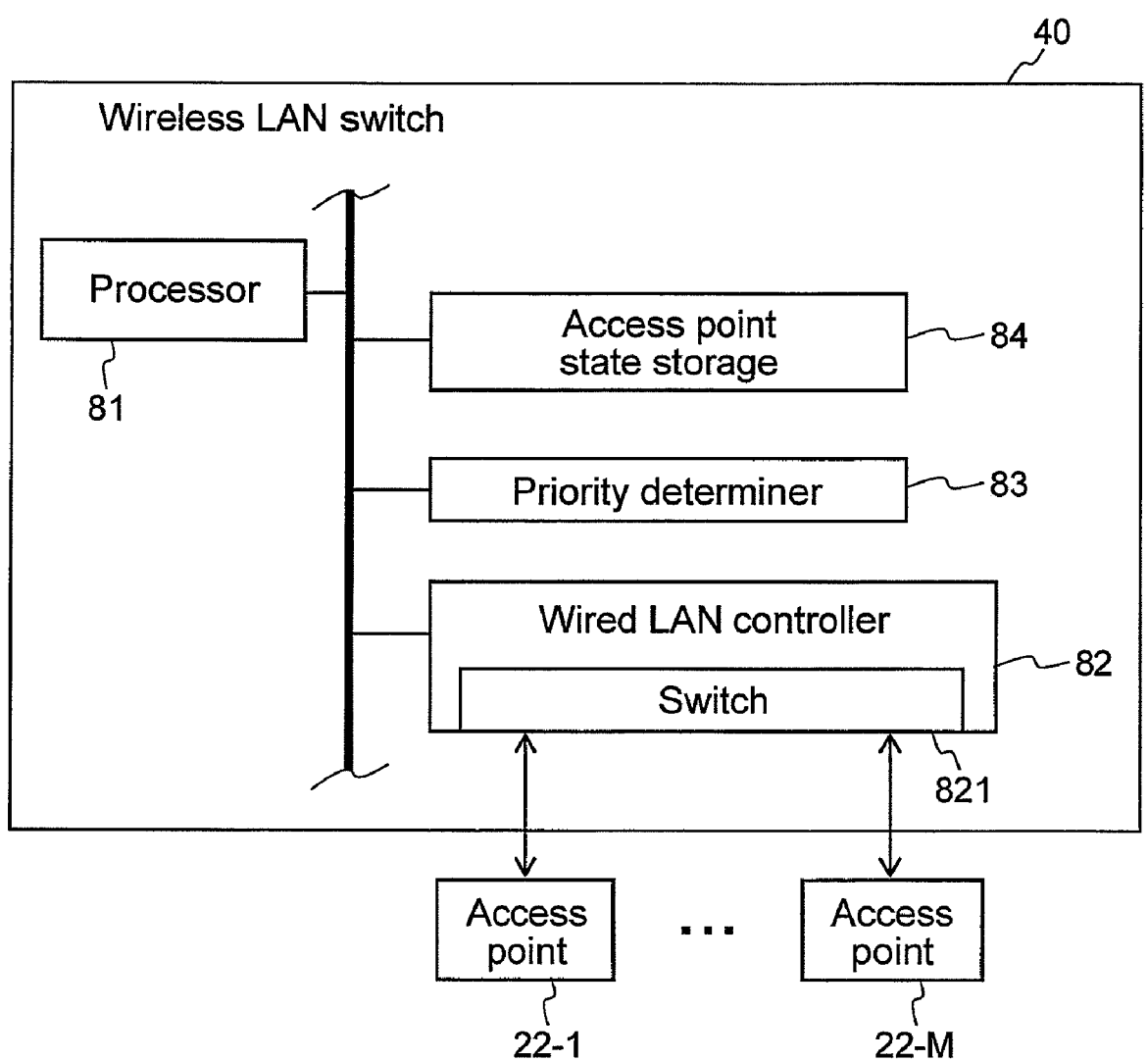
FIG. 10 is a block diagram illustrating the configuration of a wireless LAN switch in the second embodiment.

The configuration of the wireless LAN switch 40 will be described below with reference to FIG. 10. FIG. 10 is a block diagram illustrating the configuration of the wireless LAN switch 40. As depicted in FIG. 10, the wireless LAN switch 40 includes a processor 81, a wired communication controller 82, a priority determiner 83, and an access point state storage 84.

The wired communication controller 82 is connected to the LAN and has a configuration of able to communicate with access points 22-1 through 22-M.

In the wireless LAN system of this embodiment, the transferring of packets between terminals is performed via the access points and the wired communication controller 82. As illustrated in FIG. 10, the wired communication controller 82 includes a switch 821, and based on the header information of the packets being the transferring objects, switching is performed with respect to connection between the access points. This switching is performed under the instruction by the processor 81.

The priority determiner 83 includes equivalent functions as the priority determiner 64 of the access point 20. In the wireless LAN system of this embodiment, SIP messages are transferred via the wireless LAN switch 40 with the signals transmitted from and signals received at the communication terminal 10. Then, the priority determiner 83 determines the priority of a call based on the phone number of the transmitting terminal or the receiving terminal included in the SIP message that is transferred.

The processor 81 sequentially records the RELAY DECISION NOTICES sent from each of the access points 22 in the access point state storage 84. When an access point request signal (AP_REQ) is received from the access point 22, or when a SIP message for a new call having a high priority is received from the SIP server 30, the processor 81 refers to the access point state storage 84, and selects an access point that is able to relay that new call.

[Operation of the Wireless LAN System]

Figure 11:
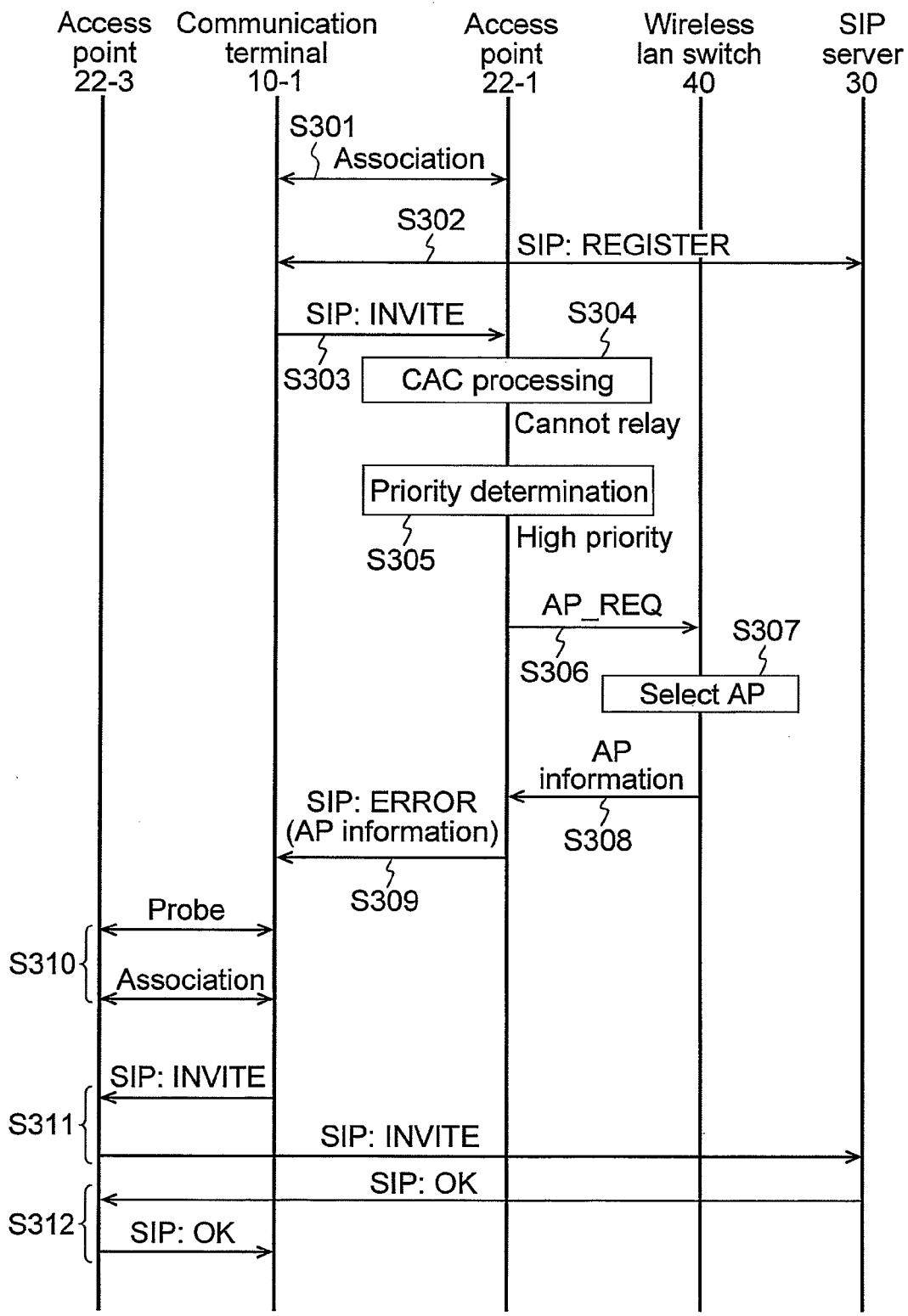
FIG. 11 is a flow diagram illustrating the overall operation in the case that the establishment of a call high in priority is requested from a communication terminal (in the case of transmitting a signal), in the second embodiment.
Figure 12:
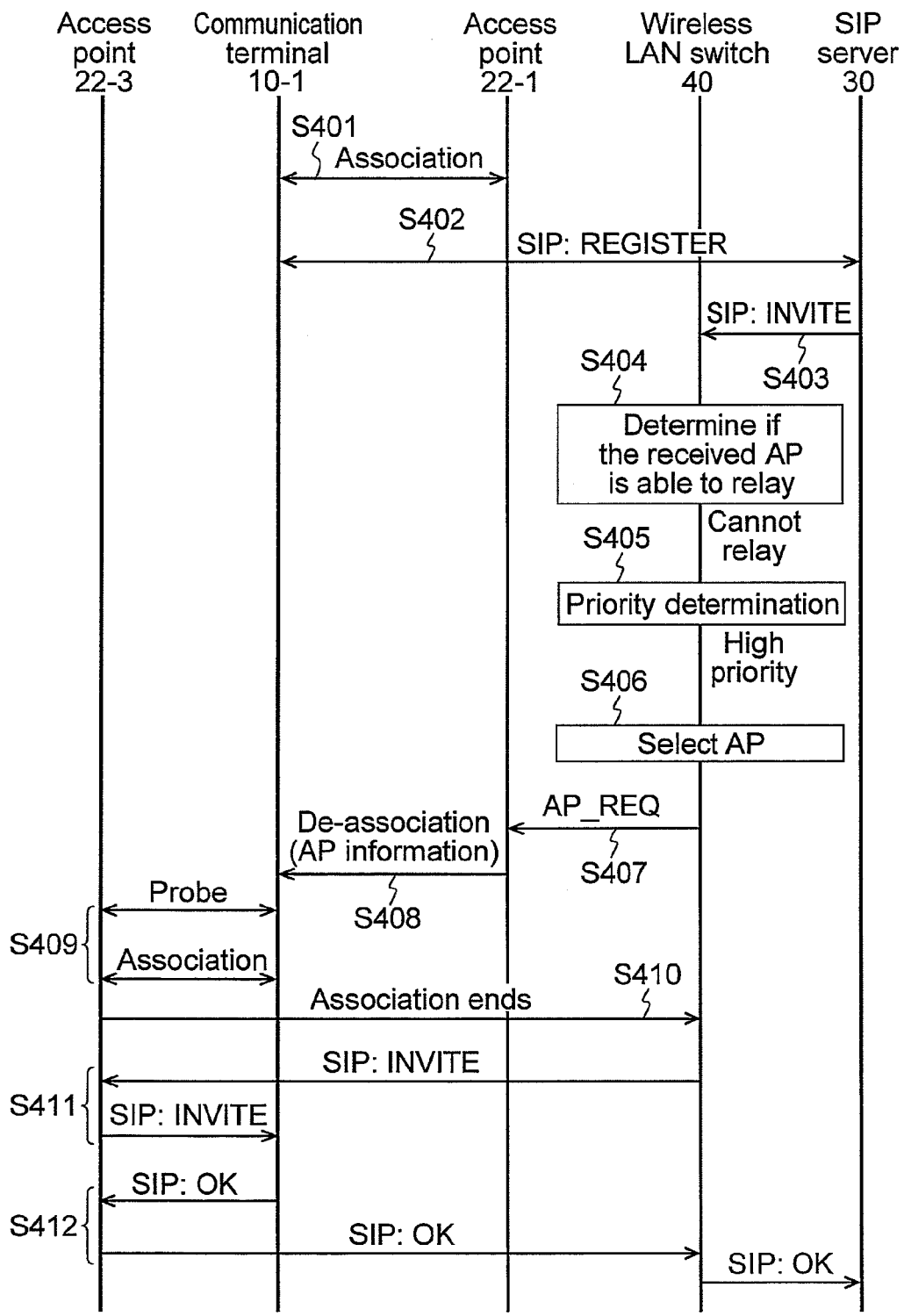
FIG. 12 is a flow diagram illustrating the overall operation in the case that the establishment of a call high in priority is requested with respect to a communication terminal (in the case of receiving a signal), in the second embodiment.

The overall operation of the wireless LAN system of this embodiment will be described below with reference to FIGS. 11 and 12. FIG. 11 is a flow diagram illustrating the overall operation in the case that the establishment of a call that is high in priority is requested from a communication terminal (in the case of transmitting a signal). FIG. 12 is a flow diagram illustrating the overall operation in the case that the establishment of a call having a high priority is requested with respect to a communication terminal (in the case of receiving a signal).

(1) In the Case of Transmitting a Signal

In FIG. 11, as an example, the overall operation of the wireless LAN system is represented, in the case that the communication terminal 10-1 within the communication area of the access point 22-1 transmits a signal specifying, for instance, an external number, as a call high in priority.

First, in FIG. 11, the communication terminal 10-1 transmits an association request packet (Association) to the access point 22-1, and when an association response packet is received from the access point 22-1, wireless communication between the communication terminal 10-1 and the access point 22-1 is started (Step S301).

Prior to calling, the communication terminal 10-1 transmits a REGISTER request (SIP: REGISTER) including the phone number of its own terminal to the SIP server 30 via the access point 22-1 and the wireless LAN switch 40 (Step S302). Based on this REGISTER request, the URI of the communication terminal 10-1 and the corresponding IP address are registered in the SIP server 30.

Here, if a calling operation is performed with the external number specified for the communication terminal 10-1, the communication terminal 10-1 transmits an INVITE request (SIP: INVITE) to the access point 22-1 (Step S303). The access point 22-1 does not immediately transfer this INVITE request (SIP: INVITE) to the wireless LAN switch 40, and performs the processes of Steps S304 and S305.

The access point 22-1 determines whether if it is possible to relay the new call arose in Step S303 by performing CAC processing (Step S304). As a result, if it is determined that the new call cannot be relayed, the access point 22-1 determines the priority of the new call that arose in Step S303 (Step S305). This priority determination is performed based on the phone number described in the header of the INVITE request received in Step S303. In this example of the overall operation, since the phone number of the receiving terminal is an external number, in Step S305, the priority of the new call is determined to be high.

If it is determined by the CAC processing that the call cannot be relayed and determined that the priority of the new call is high, the access point 22-1 transmits an access point request signal (AP_REQ) to the wireless LAN switch 40 in order to inquire about another access point that is able to relay, in order for another access point to relay that new call (Step S306).

With the wireless LAN switch 40, in response to this access point request signal (AP_REQ), an access point (AP) that is able to relay the new call is selected (Step S307). In the selecting of this access point, the access point state storage 84 inside the wireless LAN switch 40 is being referred. Then, the wireless LAN switch 40 transmits the access point information (AP information), used for connecting to another access point that is able to relay, to the access point 22-1 (Step S308).

The access point 22-1 transmits an ERROR response (SIP: ERROR) including the access point information (AP information) to the communication terminal 10-1 as a SIP message (Step S309). The communication terminal 10-1 analyzes the SIP message received, recognizes that the INVITE request cannot be accepted, and tries to connect to the access point (in the example illustrated in FIG. 11, access point 22-3) specified by the access point information included inside the SIP message (Step S310).

At this time, if information related to the place in which the access point that is able to relay the call is disposed is included in the access point information, it is preferable that the communication terminal 10-1 displays such place. As a result, it encourages the user of the communication terminal 10-1 to move to a position that is near the place of that access point, and the communication state of that access point and the communication terminal 10-1 becoming excellent is expected.

In addition, in Step S310, the wireless LAN switch 40 may control the plurality of access points 22-1 through 22-M so that an access point other than the access point 22-3 does not respond to a probe request packet from the communication terminal 10-1.

The communication terminal 10-1 transmits an INVITE request (SIP: INVITE) again, when communication with the access point 22-3 starts. This INVITE request is transmitted to the SIP server 30 via the access point 22-3 and the wireless LAN switch 40 (Step S311). Then, the SIP server 30 transfers an OK response (SIP: OK) from the receiving terminal to the communication terminal 10-1 via the wireless LAN switch 40 and the access point 22-3, as a response to this INVITE request (Step S312). After that, calling by the transferring of voice packets according to RTP/RTCP is started between the terminals.

(2) In the Case of Receiving a Signal

In FIG. 12, as an example, the overall operation of the wireless LAN system is represented, in the case that the communication terminal 10-1 within the communication area of the access point 22-1 receives a signal that indicates, for instance, an external number, as a call high in priority.

First, in FIG. 12, the communication terminal 10-1 transmits an association request packet (Association) to the access point 22-1, and when an association response packet is received from the access point 22-1, wireless communication between the communication terminal 10-1 and the access point 22-1 is started (Step S401).

Prior to calling, the communication terminal 10-1 transmits a REGISTER request (SIP: REGISTER) including the phone number of its own terminal to the SIP server 30 via the access point 22-1 and the wireless LAN switch 40 (Step S402). Based on this REGISTER request, the URI of the communication terminal 10-1 and the corresponding IP address are registered in the SIP server 30.

Here, when there is a receipt of a signal (new call) with communication terminal 10-1 as the destination, the SIP server 30 transfers the INVITE request (SIP: INVITE) from the transmitting terminal to the wireless LAN switch 40 (Step S403). The wireless LAN switch 40 does not immediately transfer this INVITE request (SIP: INVITE) to the access point 22-1, and performs the processes of Steps S404 to S406.

First, the wireless LAN switch 40 refers to the access point state storage 84, and determines whether if access point 22-1 that is connected to the communication terminal 10-1, which is the destination to receive the signal, is able to relay the new call (Step S404). Here, if the access point 22-1 cannot relay the new call, the priority of that new call is determined based on the phone number of the transmitting terminal (in the example in FIG. 12, an external number) that is included in the INVITE request received in Step S403 (Step S405). Then, if the priority of the new call is determined to be high, the wireless LAN switch 40 refers to the access point state storage 84, and selects another access point (AP) that is able to relay that new call (Step S406). As a result, the wireless LAN switch 40 transmits an access point switching request signal (AS_REQ) including access point information of the selected access point to the access point 22-1 (Step S407).

The access point 22-1 transmits a de-association notice packet with the access point information (AP information) included in the access point switching request signal (AS_REQ) to the communication terminal 10-1 (Step S408). The communication terminal 10-1 that received the de-association notice packet tries to connect to the access point (in the example illustrated in FIG. 12, access point 22-3) specified by the access point information that is transmitted with the packet (Step S409).

At this time, if information related to the place in which the access point that is able to relay the call is disposed is included in the access point information, it is preferable that the communication terminal 10-1 displays such place. As a result, it encourages the user of the communication terminal 10-1 to move to a position that is near the place of that access point, and the communication state of that access point and the communication terminal 10-1 becoming excellent is expected.

In addition, in Step S409, the wireless LAN switch 40 may control the plurality of access points 22-1 through 22-M so that an access point other than the access point 22-3 does not respond to a probe request packet from the communication terminal 10-1.

The access point 22-3 notifies the wireless LAN switch 40 that the association with the communication terminal 10-1 has ended, when the process of Step S409 ends (Step S410). In response to this notice, the wireless LAN switch 40 transfers the INVITE request (SIP: INVITE) that has been kept in the meantime to the communication terminal 10-1 via the access point 22-3 (Step S411). Then, when a signal receipt response operation is performed with respect to the communication terminal 10-1, an OK response (SIP: OK) in response to this INVITE request is transferred to the SIP server 30 via the access point 22-3 and the wireless LAN switch 40 (Step S412). After that, calling by transferring of voice packets according to RTP/RTCP is started between the terminals.

As described above, with the wireless LAN system of this embodiment, a wireless LAN switch is provided for managing a plurality of access points, and even if a new call that is high in priority of the communication terminal cannot be relayed by the access point to which the communication terminal is connected, another access point that is able to relay is selected by the wireless LAN switch, and the information (access point information) used for connecting to the selected access point is provided to the communication terminal. Therefore, with this wireless LAN system, even if a localized congested state exists in the plurality of access points, the relaying of a new call that is high in priority is possible by utilizing the entire communication resource of the plurality of access points.

Third Embodiment

Figure 13:
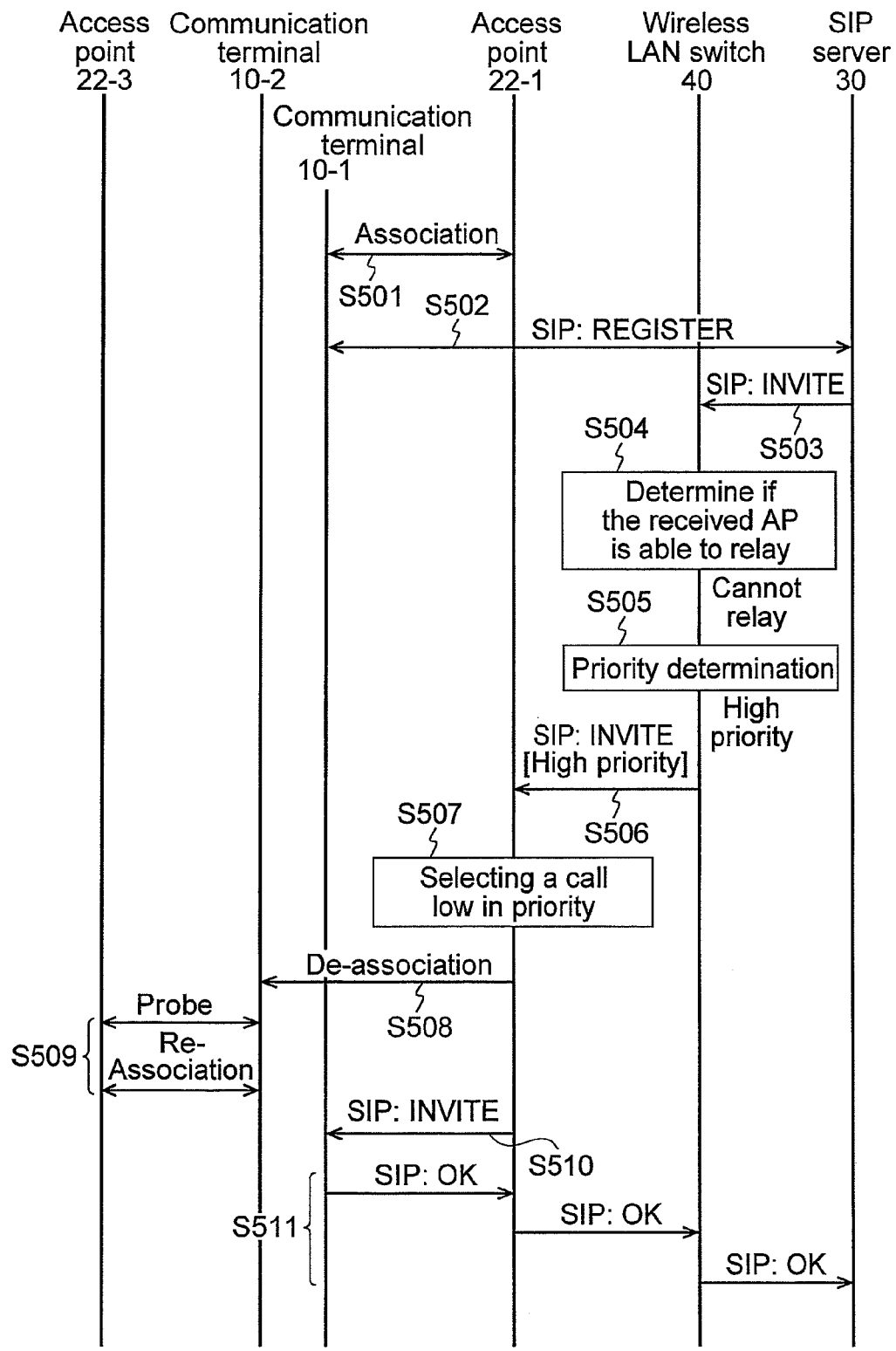
FIG. 13 is a flow diagram illustrating the overall operation in the case that the establishment of a call high in priority is requested with respect to a communication terminal (in the case of receiving a signal), in a third embodiment.

As a modified example of the wireless LAN system of the second embodiment, a wireless LAN system of a third embodiment will be described with reference to FIG. 13. FIG. 13 is a flow diagram illustrating the overall operation, in the case that the establishment of a call that is high in priority is requested with respect to a communication terminal (in the case of receiving a signal).

The wireless LAN system of this embodiment is different in the configuration thereof compared to that of the second embodiment (those illustrated in FIGS. 9 and 10) in that a call management memory table (having the same functions as the call management memory table 66 in FIG. 2) is included for managing calls that are being relayed by each of the access points. In addition, in the wireless LAN system of this embodiment, in the operation thereof, it is different from that of the second embodiment only in the case of receiving a signal.

In FIG. 13, the processes of Steps S501 through S505 are same as Steps S401 through S405 in FIG. 12. In this embodiment, if the access point 22-1 that is connected to the communication terminal 10-1, which is the destination to receive the signal, cannot relay a new call, and the priority of that new call is high, the wireless LAN switch 40 does not introduce another access point, but instructs the access point 22-1 to stop relaying a call that is low in priority and is being relayed. More specifically, this instruction is performed by the wireless LAN switch 40 transferring the INVITE request to the access point 22-1 after the information indicating the priority being high (High priority) is stated (Step S506).

The access point 22-1 that received this instruction refers to the call management memory table and selects a call that is low in priority from the calls that are being relayed (Step S507), and transmits a de-association notice packet (De-association) to the communication terminal (in the example in FIG. 13, communication terminal 10-2) that the call low in priority is established (Step S508). By doing so, communication of the communication terminal 10-2 with the access point 22-1 is stopped. After that, the communication terminal 10-2 is able to start communication with an access point (in the example in FIG. 13, access point 22-3) other than the access point 22-1 (Step S509).

After the process of Step S508, the access point 22-1 transfers the INVITE request (SIP: INVITE) that has been kept in the meantime to the communication terminal 10-1 (Step S510). Then, when a signal receipt response operation is performed with respect to the communication terminal 10-1, an OK response (SIP: OK) in response to the INVITE request is transferred to the SIP server 30 via the access point 22-1 and the wireless LAN switch 40 (Step S511).

Fourth Embodiment

Next, a wireless LAN system of a fourth embodiment will be described.

With the wireless LAN system of this embodiment, a wireless LAN switch manages in an integrated fashion in both the cases of transmitting a signal and receiving a signal, by which access point a new call is to be relayed. Therefore, with the wireless LAN system of the fourth embodiment, the determination of the priority of a new call from a communication terminal or to a communication terminal, and the determination of whether if each access point is able to relay a new call are performed by the wireless LAN switch.

Figure 14:
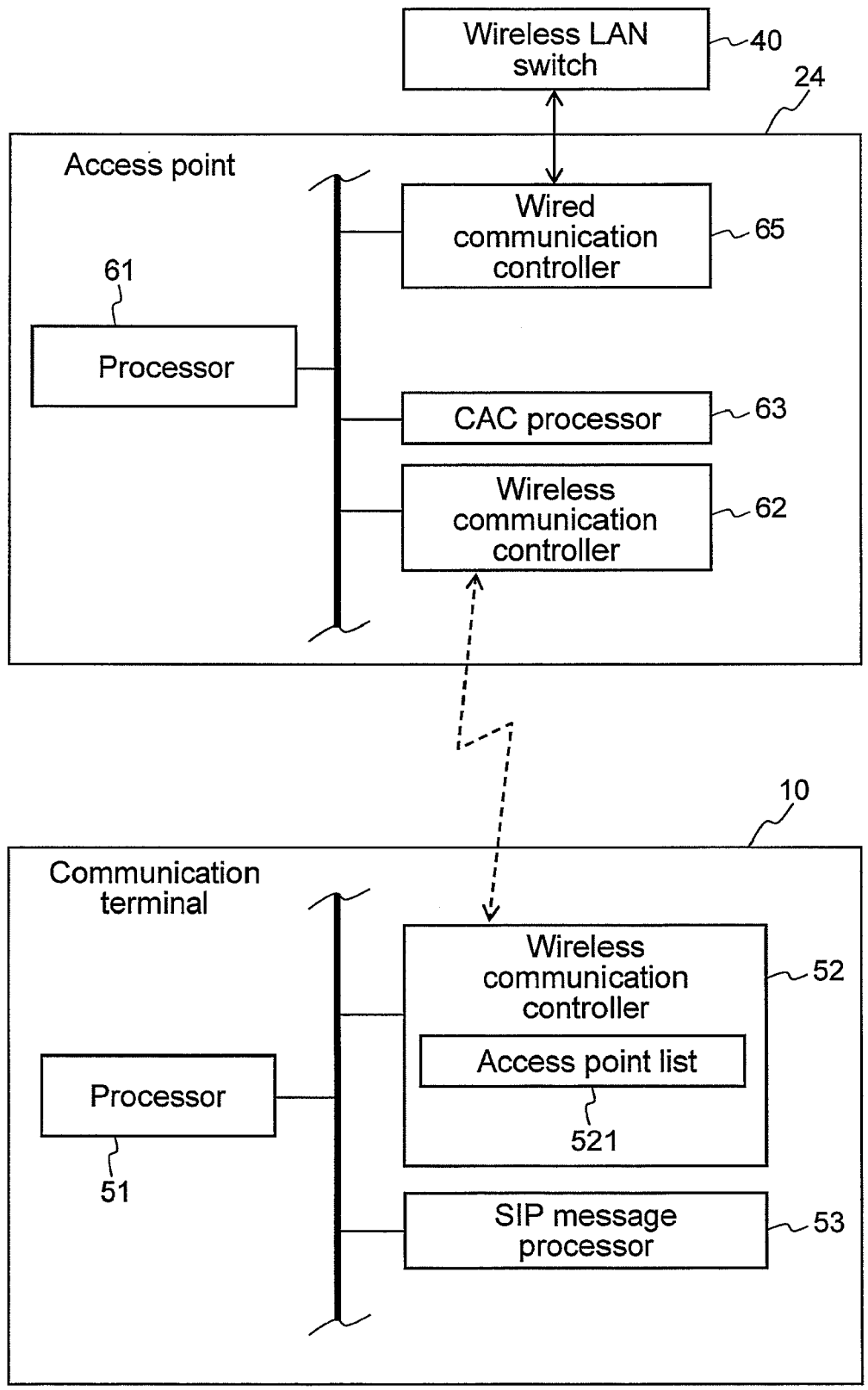
FIG. 14 is a block diagram illustrating the configuration of a communication terminal and an access point in the wireless LAN system of a fourth embodiment.

The configuration of the wireless LAN system of the fourth embodiment will be described below with reference to FIG. 14. FIG. 14 is a block diagram illustrating the configuration of the communication terminal 10 and the access point 24 in the wireless LAN system of this embodiment. Furthermore, in FIG. 14, portions same as those of the communication terminal 10 and the access point 20 illustrated in FIG. 2 are given the same numerals. And, the configuration of the wireless LAN switch 40 in this embodiment is same as that described in the second embodiment (refer to FIG. 10).

[Access Point 24]

The access point 24 in this embodiment, different from the access point 22 in the second embodiment, does not need a priority determiner for determining the priority of a new call.

The access point 24, same as the access point 22, transmits a RELAY DECISION NOTICE to the wireless LAN switch 40 based on the processing result of the CAC processor 63.

The transmitting of this RELAY DECISION NOTICE is performed at a predetermined timing. The transmitting of the RELAY DECISION NOTICE, for example, may be performed regularly, may be performed when the access point 24 received an INVITE request, or may be performed when the processing result of whether or not a new call can be relayed changed. The RELAY DECISION NOTICES sent from each access point 24 are sequentially recorded in the access point state storage 84 of the wireless LAN switch 40.

[Operation of the Wireless LAN System]

Figure 15:
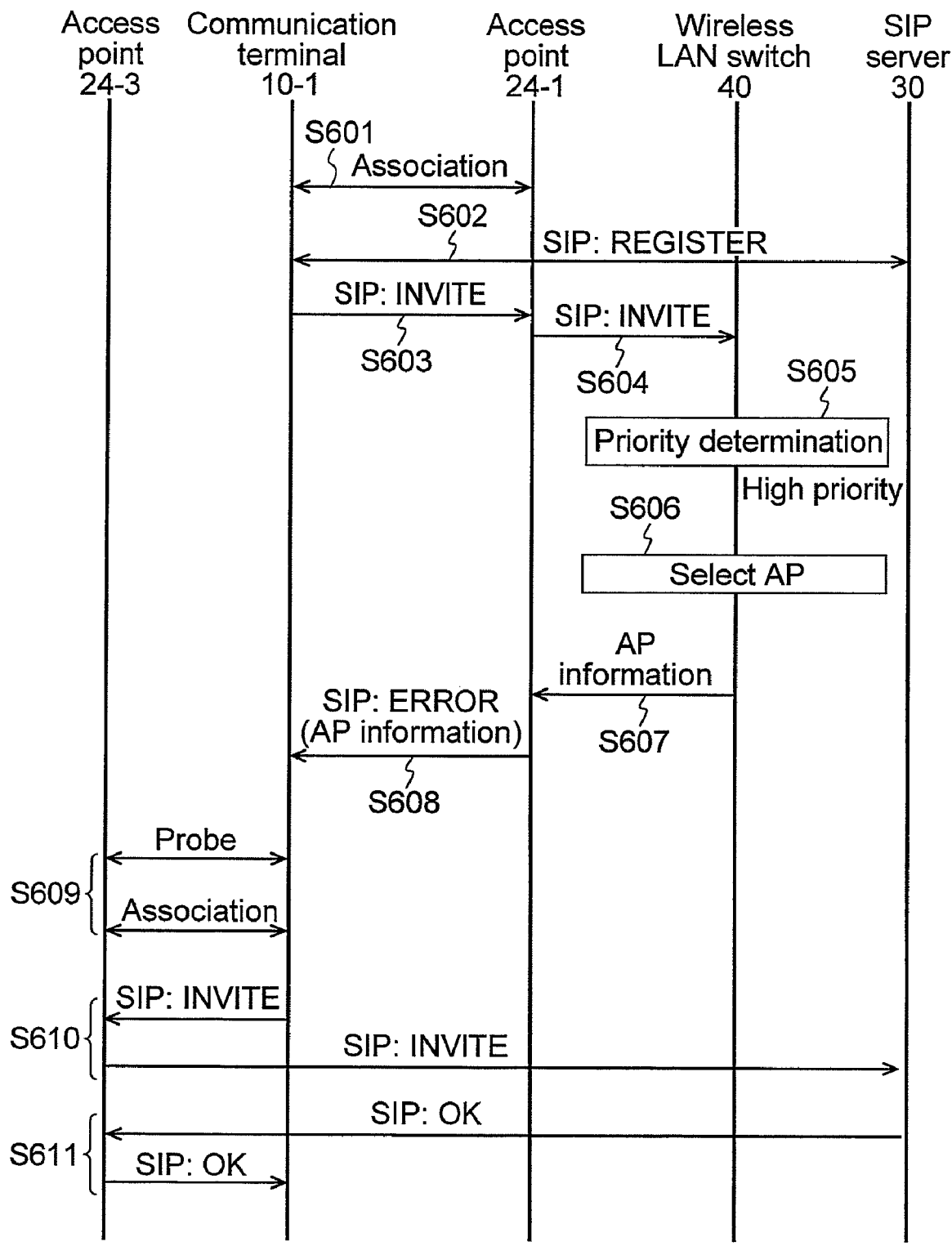
FIG. 15 is a flow diagram illustrating the overall operation in the case that the establishment of a call high in priority is requested with respect to a communication terminal (in the case of receiving a signal), in the fourth embodiment.

The overall operation of the wireless LAN system of this embodiment will be described below with reference to FIG. 15. FIG. 15 is a flow diagram illustrating the overall operation in the case that the establishment of a call that is high in priority is requested from a communication terminal (in the case of transmitting a signal). In addition, in this embodiment, the flow diagram illustrating the overall operation in the case that the establishment of a call that is high in priority is requested with respect to a communication terminal (in the case of receiving a signal) is the same as that of FIG. 12.

The case of transmitting a signal, illustrated in FIG. 15, will be described below, while comparing with FIG. 11 of the second embodiment.

In FIG. 15, as an example, the overall operation of the wireless LAN system is represented, in the case that the communication terminal 10-1 within the communication area of the access point 24-1 transmits a signal specifying, for instance, an external number, as a call high in priority.

In FIG. 15, wireless communication between the communication terminal 10-1 and the access point 24-1 is started, and prior to calling, the process of transmitting a REGISTER request (SIP: REGISTER) including the phone number of its own terminal to the SIP server 30 via the access point 24-1 and the wireless LAN switch 40 (Steps S601 and S602) is the same as the Steps S301 and S302 in FIG. 11.

With the wireless LAN system of this embodiment, the access point 24-1 transfers the INVITE request (SIP: INVITE) that is sent from the communication terminal 10-1 in Step S603 as it is to the wireless LAN switch 40 without determining whether if relaying is possible (Step S604).

The wireless LAN switch 40 then determines the priority of the new call that occurred in Step S603 (Step S605). This priority determination is performed based on the phone number described in the header of the INVITE request received in Step S603. In this example of the overall operation, since the phone number of the receiving terminal is an external number, in Step S605, the priority of the new call is determined to be high.

Furthermore, the wireless LAN switch 40 refers to the access point state storage 84, and selects an access point (AP) that is able to relay the new call (Step S606).

Generally, a wireless LAN switch performs the switching (handover process) of the access point to which the communication terminal is connected based on the location information from each communication terminal. Therefore, it is preferable that the wireless LAN switch 40 of this embodiment selects an access point in consideration to the location information of the communication terminal 10-1 in the above Step S606. In the example in FIG. 15, in Step S606, it is preferable that the access point 24-1 or an access point nearby is preferentially selected from the plurality of access points that are able to relay the new call.

In FIG. 15, processes on and after Step S607 are same as the processes on and after Step S308 in FIG. 11, and therefore, description thereof is omitted here.

As described above, with the wireless LAN system of this embodiment, a wireless LAN switch is provided for managing a plurality of access points, and this wireless LAN switch 40 manages in an integrated fashion by which access point a new call is to be relayed. Therefore, with this wireless LAN system, same as that of the second embodiment, even if a localized congested state exists in the plurality of access points, the relaying of a new call that is high in priority is possible by utilizing the entire communication resource of the plurality of access points.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alternations could be made hereto without departing from the spirit and scope of the invention.

What is claimed is:

1. A system for relaying a voice call between communication terminals, comprising:

a first access point and a second access point wirelessly connected to communication terminals positioned within the wireless range of the first access point or the second access point, wherein the communication terminals are located in local area networks and adapted to receive voice input, and a communication management device for managing the communication state of each of the first access point and the second access point, wherein the first access point and the second access point give the communication management device a notice of whether or not a new voice call can be relayed at a predetermined timing based on the communication capacity of its own access point, and when there is a relaying request of a new voice call from a communication terminal or to a communication terminal, if the priority of the new voice call is higher compared to a voice call that is being relayed, and the first access point to which the communication terminal is connected cannot relay the new voice call, the communication management device selects the second access point that is able to relay the new voice call, based on the notice from the first access point and the second access point, and sends the information used for connecting to the second access point to the communication terminal via the first access point, wherein the information used for connecting includes the physical location of the access points that are able to relay the voice call, and wherein the communication management device preferentially selects the second access point from access points nearby the physical location of the first access point.

2. The system according to claim 1, wherein the first access point and the second access point comprise a relay determiner for determining whether if a new voice call can be relayed based on the communication capacity, when there is a relaying request of a new voice call from a communication terminal or to a communication terminal; and a priority determiner for determining whether if the priority of the new voice call is higher compared to a voice call that is being relayed, the first access point requests information used for connecting to an access point other than its own access point from the communication management device, when there is a relaying request of the new voice call from the communication terminal connected to its own access point, and in the case that it is determined that the new voice call cannot be relayed and that the priority of the new voice call is high, and the communication management device selects the second access point in response to the relaying request.

3. The system according to claim 1, wherein the communication management device comprises a priority determiner for determining whether if the priority of a new voice call is high compared to a voice call that is being relayed, and the communication management device selects the second access point when there is a relaying request of the new voice call to the communication terminal connected to the first access point, and in the case that it is recognized that the first access point cannot relay the new voice call based on the notice and it is determined that the priority of the new voice call is high.

4. A method for relaying a voice call between communication terminals using a first access point and a second access point wirelessly connected to communication terminals, positioned within the wireless range of the first access point or the second access point, wherein the communication terminals are located in local area networks and adapted to receive voice input, and a communication management device for managing the communication state of the first access point and the second access point, the method comprising:

a step in which the communication management device receives a notice of whether if a new voice call can be relayed from the first access point and the second access point at a predetermined timing;

a step in which when there is a relaying request of the new voice call from a communication terminal or to a communication terminal, if the priority of the new voice call is high compared to a voice call that is being relayed and that the first access point connected to the communication terminal cannot relay the new voice call, the communication management device selects the second access point that is able to relay the new voice call based on the notice from the first access point; and a step in which the communication terminal being the object of the new voice call obtains information used for connecting to the second access point via the first access point from the communication management device wherein the information used for connecting includes the physical location of the access points that are able to relay the voice call, and wherein the communication management device preferentially selects the second access point from access points nearby the physical location of the first access point.

5. The method according to claim 4, wherein the communication management device preferentially selects the second access point from access points nearby the first access point.

* * * * *